(12) United States Patent
Kim et al.

(10) Patent No.: US 10,540,748 B2
(45) Date of Patent: Jan. 21, 2020

(54) METHOD AND APPARATUS FOR CHANGING IMAGES OF CONTENT DISPLAYED ON A DISPLAY

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 48 days.

(21) Appl. No.: 15/434,570

(22) Filed: Feb. 16, 2017

(65) Prior Publication Data

US 2017/0236493 A1    Aug. 17, 2017

(30) Foreign Application Priority Data

Feb. 17, 2016    (KR) .......................... 10-2016-0018558

(51) Int. Cl.

| | | |
|---|---|---|
| *G06T 3/40* | (2006.01) | |
| *G11B 27/038* | (2006.01) | |
| *G06T 7/174* | (2017.01) | |
| *G09G 5/34* | (2006.01) | |
| *G09G 5/14* | (2006.01) | |
| *G06T 7/11* | (2017.01) | |
| *G09G 5/00* | (2006.01) | |

(52) U.S. Cl.
CPC ............ *G06T 3/4038* (2013.01); *G06T 7/174* (2017.01); *G09G 5/14* (2013.01); *G09G 5/34* (2013.01); *G11B 27/038* (2013.01); *G06T 7/11* (2017.01); *G09G 5/00* (2013.01); *G09G 2340/14* (2013.01)

(58) Field of Classification Search
CPC ......... G06T 7/11; G06T 7/174; G06T 3/4038; G09G 5/34; G09G 5/14
See application file for complete search history.

(56) References Cited

U.S. PATENT DOCUMENTS

| | | | |
|---|---|---|---|
| 6,795,053 B1 | 9/2004 | Funamoto et al. | |
| 7,876,334 B2* | 1/2011 | Bychkov | G06T 11/60 |
| | | | 345/620 |
| 8,139,083 B2* | 3/2012 | de Leon | H04N 1/00183 |
| | | | 345/619 |
| 10,217,251 B2* | 2/2019 | Krauss | A61B 6/032 |
| 2003/0025810 A1* | 2/2003 | Pilu | G06K 9/00221 |
| | | | 348/239 |
| 2004/0001644 A1 | 1/2004 | Kita et al. | |

(Continued)

FOREIGN PATENT DOCUMENTS

| | | |
|---|---|---|
| JP | 2001-27890 A | 1/2001 |
| KR | 10-2014-0073327 | 6/2014 |

*Primary Examiner* — Michelle L Sams
(74) *Attorney, Agent, or Firm* — Greer Burns & Crain Ltd.

(57) ABSTRACT

Provided is an image displaying apparatus including a display configured to display a first image; a checker configured to check a correlation between the first image and a second image by analyzing the first and second images; a determiner configured to determine a change effect to be applied when the display is changed from a state of displaying the first image to a state of displaying the second image, based on the correlation; and a changer configured to change an image displayed on the display from the first image to the second image by applying the change effect.

16 Claims, 14 Drawing Sheets

(56) References Cited

U.S. PATENT DOCUMENTS

| | | | |
|---|---|---|---|
| 2005/0012758 A1* | 1/2005 | Christou | G09G 3/20 345/619 |
| 2005/0219384 A1* | 10/2005 | Herberger | G06T 1/0007 348/239 |
| 2008/0075388 A1* | 3/2008 | Nishijima | G06K 9/00228 382/282 |
| 2009/0268987 A1* | 10/2009 | Tsuda | G06T 13/80 382/305 |
| 2012/0011464 A1* | 1/2012 | Hayashi | H04N 1/00458 715/784 |
| 2013/0124951 A1* | 5/2013 | Shechtman | G06T 13/80 715/201 |
| 2013/0169763 A1 | 7/2013 | Choi et al. | |
| 2013/0169844 A1* | 7/2013 | Watts | G06T 5/006 348/239 |
| 2014/0300692 A1* | 10/2014 | Lablans | G03B 37/00 348/38 |
| 2015/0036931 A1* | 2/2015 | Loui | G06K 9/46 382/195 |
| 2015/0070523 A1* | 3/2015 | Chao | H04N 5/23216 348/218.1 |

\* cited by examiner

METHOD AND APPARATUS FOR CHANGING IMAGES OF CONTENT DISPLAYED ON A DISPLAY

CROSS-REFERENCE TO RELATED APPLICATION

This application claims priority under 35 U.S.C. § 119 to Korean Patent Application No. 10-2016-0018558 filed on Feb. 17, 2016, in the Korean Intellectual Property Office, the entire contents of which are incorporated herein by reference.

BACKGROUND

1. Field

One or more embodiments of the invention relate to an image displaying apparatus, method, and computer program.

2. Description of the Related Art

This section provides background information related to the present disclosure which is not necessarily prior art.

With the popularization of electronic apparatuses, such as desktop computers and smart phones, it has become easy for users to access various types of digital content through their electronic apparatuses. Accordingly, the users are able to enjoy digital images, such as digital photos, digital drawings, and digital cartoons, by using such electronic apparatuses.

Here, when a plurality of digital images are correlated to each other, the digital images may be provided in consideration of such correlation so as to provide high quality digital images to the users.

Information disclosed in this Background section was already known to the inventors before achieving the present disclosure or is technical information acquired in the process of achieving the present disclosure. Therefore, it may contain information that does not form the prior art that is already known to the public in this country.

SUMMARY

This section provides a general summary of the disclosure, and is not a comprehensive disclosure of its full scope or all of its features.

One or more embodiments include an image displaying apparatus, method, and computer program, which analyze a current image currently being displayed and a subsequent image to be displayed to determine a change effect applied when a displayed image is changed from the current image to the subsequent image.

One or more embodiments include an image displaying apparatus, method, and computer program, which analyze a correlation between a current image and a subsequent image and change the displayed image from the current image to the subsequent image by applying a change effect suitable according to a result of analyzing the correlation.

Additional aspects will be set forth in part in the description which follows and, in part, will be apparent from the description, or may be learned by practice of the presented embodiments.

According to one or more embodiments, an image displaying apparatus includes a display configured to display a first image; a checker configured to check a correlation between the first image and a second image by analyzing the first and second images; a determiner configured to determine a change effect to be applied when the display is changed from a state of displaying the first image to a state of displaying the second image, based on the correlation; and a changer configured to change an image displayed on the display from the first image to the second image by applying the change effect.

Here, the image displaying apparatus may check whether the first and second images are each at least a part of the same image, determine a change effect of an image based on a result of the checking, and change the first image to the second image according to the determined change effect.

According to one or more embodiments, an image displaying method performed by an image displaying apparatus includes displaying a first image; checking a correlation between the first image and a second image by analyzing the first and second images; determining a change effect to be applied when the first image is changed to the second image based on the correlation; and changing an image being displayed from the first image to the second image by applying the change effect.

Here, the image displaying method may further include checking whether the first and second images are each at least a part of the same image, determining a change effect of an image based on a result of the checking, and changing the first image to the second image according to the determined change effect.

According to one or more embodiments, a computer program executes the image displaying method by using a computer.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
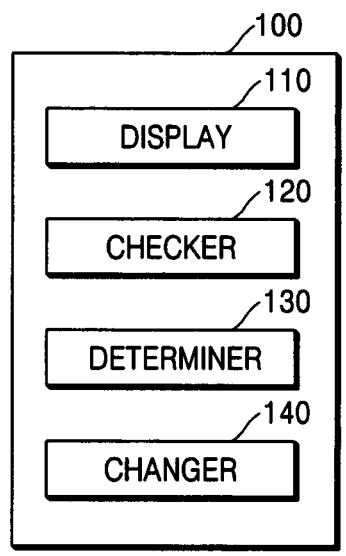
FIG. 1 is a block diagram of an image displaying apparatus according to an embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by the example embodiments.

DETAILED DESCRIPTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those of ordinary skill in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element, there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, a CPU, a controller, an ALU, a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording media, including tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a universal serial bus (USB) flash drive, a memory stick, a Blu-ray/DVD/CD-ROM drive, a memory card, and/or other similar computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other similar medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one of ordinary skill in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

FIG. 1 is a block diagram of an image displaying apparatus 100 according to an embodiment.

Referring to FIG. 1, the image displaying apparatus 100 according to an embodiment includes a display 110, a checker 120, a determiner 130, and a changer 140.

The image displaying apparatus 100 may be an electronic apparatus providing a digital image to a user. The image displaying apparatus 100 may be an electronic apparatus for storing and displaying a digital image generated by the image displaying apparatus 100 or a digital image generated from an electronic signal received from an external source.

The image displaying apparatus 100 may be one of various types of electronic apparatuses for visually displaying a digital image. Examples of the image displaying apparatus 100 include a smart phone, a laptop computer, a tablet personal computer (PC), a smart TV, a personal digital assistant (PDA), a desktop computer, a media player, a micro-server, a global positioning system (GPS) device, an electronic book terminal, a digital broadcasting terminal, a navigation device, a kiosk, an MP3 player, a digital camera, a wearable device, and other mobile or non-mobile computing apparatuses, but are not limited thereto. Also, the image displaying apparatus 100 may include any one of various apparatuses for displaying an image, such as an electronic board and a touch table. Also, the image displaying apparatus 100 may be an accessory, such as a watch, glasses, a head-mounted electronic apparatus, or a ring, which includes an image displaying function, but is not limited thereto.

The display 110 displays a digital image to be visually recognized by the user. The display 110 may display a digital image stored in the image displaying apparatus 100 or received from an external source in real-time. The display 110 may display one image at a time or simultaneously display several images.

The display 110 may include at least one of a liquid crystal display (LCD), a thin-film transistor-liquid crystal display (TFT-LCD), an organic light-emitting diode (OLED), a flexible display, a 3-dimensional (3D) display, and an electrophoretic display, but is not limited thereto. Also, the image displaying apparatus 100 may include two or more displays 110 based on a structure of the image displaying apparatus 100.

The checker 120 analyzes an image to be displayed on the display 110. For example, the checker 120 may analyze each of an image currently displayed on the display 110 and an image to be displayed on the display 110. The checker 120 may check a correlation between analyzed images. For example, when a first image is currently displayed on the display 110 and an image displayed on the display 110 is changed from the first image to a second image later, the checker 120 may analyze the first and second images to check a correlation between the first and second images. Details about the correlation between the first and second images will be described below with reference to FIGS. 4 through 15D.

The first and second images may be images included in a first image cut displayed through the display 110. Also, the first image cut may be an image cut included in a cartoon having one or more image cuts. The image cut may be a scene displaying an image inside an opaque or transparent frame. Such an image cut may include two or more images, wherein at least one of first and second images may be displayed according to a certain condition or an image being displayed may be changed from the first image to the second image. In other words, the cartoon may be a data group for providing a digital image to the user of the image displaying apparatus 100 through the display 110, in image cut units.

The checker may analyze an image by using any one of various image processing techniques. For example, the checker 120 may check a numerical value of an image, such as an RGB value, a CMY value, a YCbCr value, a luminance value, a brightness value, or a chroma value. Alternatively, the checker 120 may check a result of performing, on the entire or a part of an image, an averaging filter, a median filter, or a Gaussian filter. Alternatively, the checker 120 may check a result of performing Fourier transform on an image. In addition, the checker 120 may analyze an image by applying various noise effects and/or image processing effects on the image, or may analyze a plurality of images by applying various image processing effects throughout the plurality of images.

When an order of images displayed on the display 110 is pre-determined, the checker 120 may pre-analyze the images before the images are displayed on the display 110 or before the images displayed on the display 110 are changed, and check correlations between the images. Alternatively, the checker 120 may check a correlation between first and second images by analyzing each of the first and second images when a signal for changing the first image currently being displayed on the display 110 to the second image is received or when a timer for changing the first image to the second image is ended. Alternatively, the checker 120 may pre-analyze images stored in the image displaying apparatus 100 before the signal for changing the first image currently being displayed on the display 110 to the second image is received or when the timer for changing the first image to the second image is ended. Then, when the signal for changing the first image to the second image is received or when the timer for changing the first image to the second image is ended, the checker 120 may check the correlation between the first and second images based on analysis information of the first and second images.

The determiner 130 determines a change effect of an image based on a correlation checked by the checker 120. For example, when the first image is currently displayed on the display 110 and an image being displayed on the display 110 is changed from the first image to the second image, the determiner 130 may determine a change effect when the first image is changed to the second image based on the correlation between the first and second images. Details about the change effect will be described later with reference to FIGS. 4 through 15D.

When it is checked by the checker 120 that a specific correlation does not exist between the first and second images, the determiner 130 may determine not to apply a specific change effect when the first image is changed to the second image. Alternatively, when it is checked that a specific correlation does not exist between the first and second images, the determiner 130 may determine to apply, when the first image is changed to the second image, a certain change effect set by a manufacturer of the image displaying apparatus 100, a user of the image displaying apparatus 100, or a manufacturer of the first image and/or the second image.

The changer 140 changes the image being displayed on the display 110 from the first image to the second image by applying the change effect determined by the determiner 130. The changer 140 may directly transmit a control signal to the display 110 such that the image being displayed on the display 110 is changed, or may indirectly change the image being displayed on the display 110 by using another component.

The changer 140 may change the image being displayed on the display 110 from the first image to the second image when a change request for changing the image is received through an input unit existing inside or outside the image displaying apparatus 100. Alternatively, the changer 140 may change the image being displayed on the display 110 from the first image to the second image when a time of displaying the first image, which is calculated through an elapsed time calculator existing inside or outside the image displaying apparatus 100, has passed a certain period of time.

In FIG. 1, the checker 120, the determiner 130, and the changer 140 are shown as individual components in the image displaying apparatus 100, but an embodiment is not limited thereto. In other words, at least some of the checker 120, the determiner 130, and the changer 140 may be one apparatus included in one control apparatus. In this case, at least some of the checker 120, the determiner 130, and the changer 140 may be distinguished only by logic according to differences in logical operations. Here, at least some of the checker 120, the determiner 130, and the changer 140 may be logically distinguished so as to perform various operations by one control apparatus using different programming languages.

Figure 2:
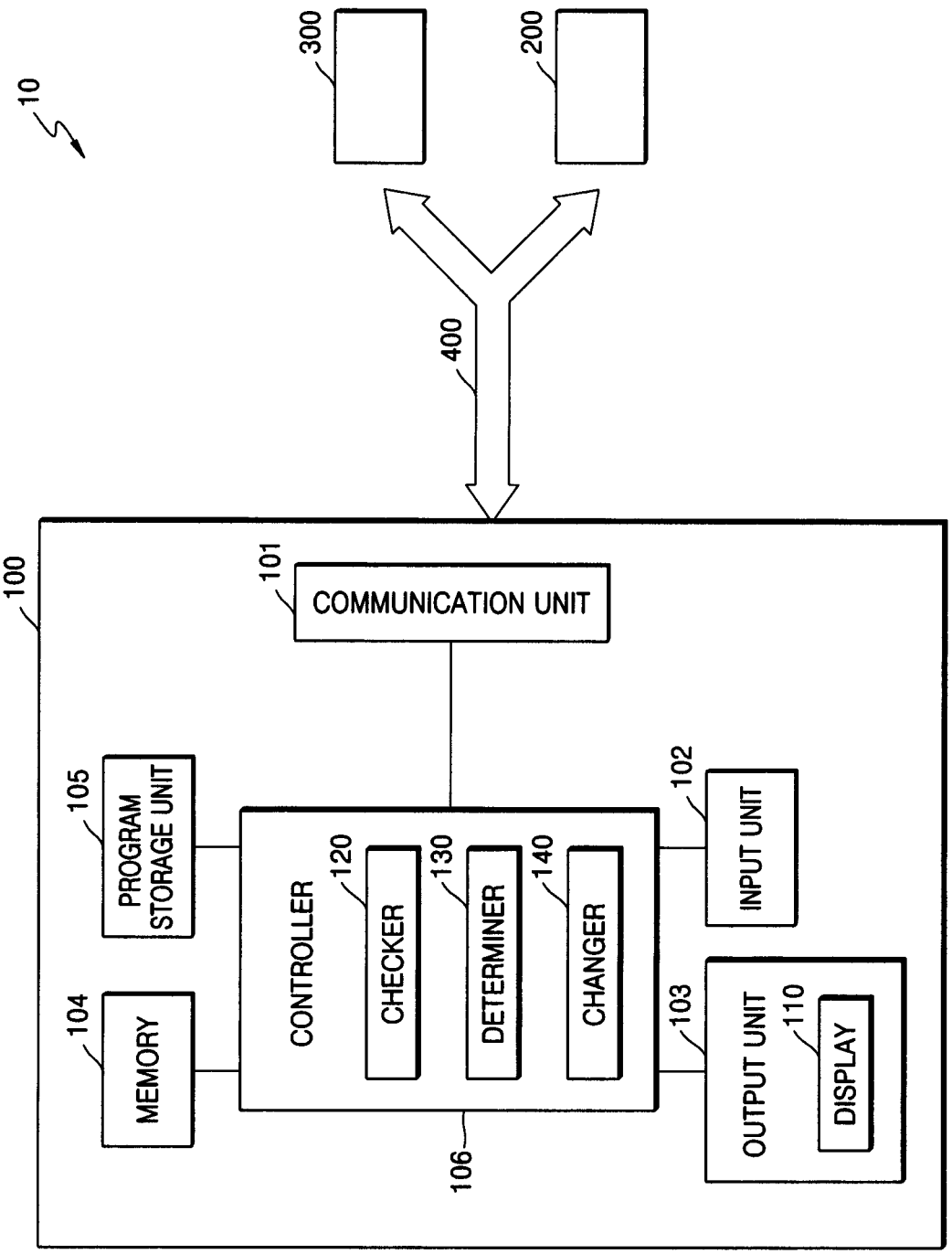
FIG. 2 is a block diagram of an image displaying system including an image displaying apparatus, according to an embodiment.

FIG. 2 is a block diagram of an image displaying system 10 including the image displaying apparatus 100, according to an embodiment.

Referring to FIG. 2, the image displaying apparatus 100 according to an embodiment is a component included in the image displaying system 10. Also, the image displaying system 10 may include a server 200 and/or an external electronic apparatus 300. Also, the image displaying system 10 may include a communication network 400 for wired/wireless communication between the image displaying apparatus 100, the server 200, and/or the external electronic apparatus 300.

The image displaying apparatus 100 includes the display 110, the checker 120, the determiner 130, and the changer 140. In addition, the image displaying apparatus 100 includes a communication unit 101, an input unit 102, an output unit 103, a memory 104, a program storage unit 105, and a controller 106.

The communication unit 101 transmits and receives data related to a digital image to and from the server 200 and/or the external electronic apparatus 300 through wired/wireless communication. Here, the communication unit 101 may transmit a signal requesting for data related to a digital image to the server 200 and/or the external electronic apparatus 300, and receive a signal requesting for data related to a digital image from the server 200 and/or the external electronic apparatus 300.

Examples of such a communication unit 101 include a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra wideband (UWB) communication unit, and an Ant+ communication unit, but are not limited thereto.

The input unit 102 receives various signals from the user of the image displaying apparatus 100. The input unit 102 may receive, from the user of the image displaying apparatus 100, a voice input, a character input, an input of pressing a button, or a touch input, but is not limited thereto.

The output unit 103 outputs a signal for transmitting information to the user of the image displaying apparatus 100 in any one of various forms. For example, the output unit 103 may visually output information to be provided through the image displaying apparatus 100. The output unit 103 may include the display 110 for providing information through a visual signal. In addition, the output unit 103 may further include a sound unit for providing information through an auditory signal.

The memory 104 performs a function of temporarily or permanently storing data processed by the controller 106. Here, the memory 104 may include a magnetic storage medium or a flash storage medium, but is not limited thereto.

The program storage unit 105 may be a component including software for performing various operations necessary or auxiliary to perform, by the image displaying apparatus 100, a service of providing a digital image.

The controller 106 generally controls overall operations of the image displaying apparatus 100. For example, the controller 106 may permit or prohibit displaying of a digital image through the display 110 by controlling displaying of a digital image through the display 110. Such a controller 106 may include the checker 120, the determiner 130, and/or the changer 140.

The controller 106 may include any type of apparatus for processing data, such as a processor. Here, the processor may be a hardware-embedded data processing apparatus having a physically structured circuit to perform a function expressed in a code or command included in a program. Examples of the hardware-embedded data processing apparatus may include processing apparatuses, such as a microprocessor, a central processing unit (CPU), a processor core, a multiprocessor, an application specific integrated circuit (ASIC), and a field programmable gate array (FPGA), but are not limited thereto.

The server 200 may be an electronic apparatus capable of transmitting and receiving data related to a digital image to and from the image displaying apparatus 100 through wired/wireless communication.

The server 200 may provide, in addition to data related to a digital image, a general search service and various services accommodating user convenience. In other words, in addition to a service of providing data related to a digital image, the server 200 may provide various services, such as a search service, an email service, a social network service (SNS), a news service, a shopping information providing service.

Alternatively, the server 200 may be connected to a server providing a portal service including search, email, news, and shopping services, and provide a webpage provided by the portal service to the image displaying apparatus 100 requesting the portal service for information. Here, the server 200 and the portal server may be physically separated individual servers or may be one server that is only conceptually distinguished.

Also, the external electronic apparatus 300 may be an electronic apparatus for transmitting and receiving data related to a digital image to and from the image displaying apparatus 100 and/or the server 200 through wired/wireless communication. Here, the external electronic apparatus 300 may be an electronic apparatus used by a user other than the user of the image displaying apparatus 100. In other words, the image displaying apparatus 100 and the external electronic apparatus 300 may be electronic apparatuses that are clearly distinguished or may be the same type of electronic apparatus determined based on a relationship between users.

The communication network 400 may provide a wired/wireless communication path between the server 200 and the image displaying apparatus 100. Also, the communication network 400 may perform a function of connecting a plurality of the image displaying apparatuses 100. Examples of the communication network 400 include wired networks, such as a local area network (LAN), a wide area network (WAN), a metropolitan area network (MAN), and an integrated service digital network (ISDN), and wireless networks, such as a wireless LAN, a CDMA, Bluetooth, and satellite communication, but are not limited thereto.

Figure 3:
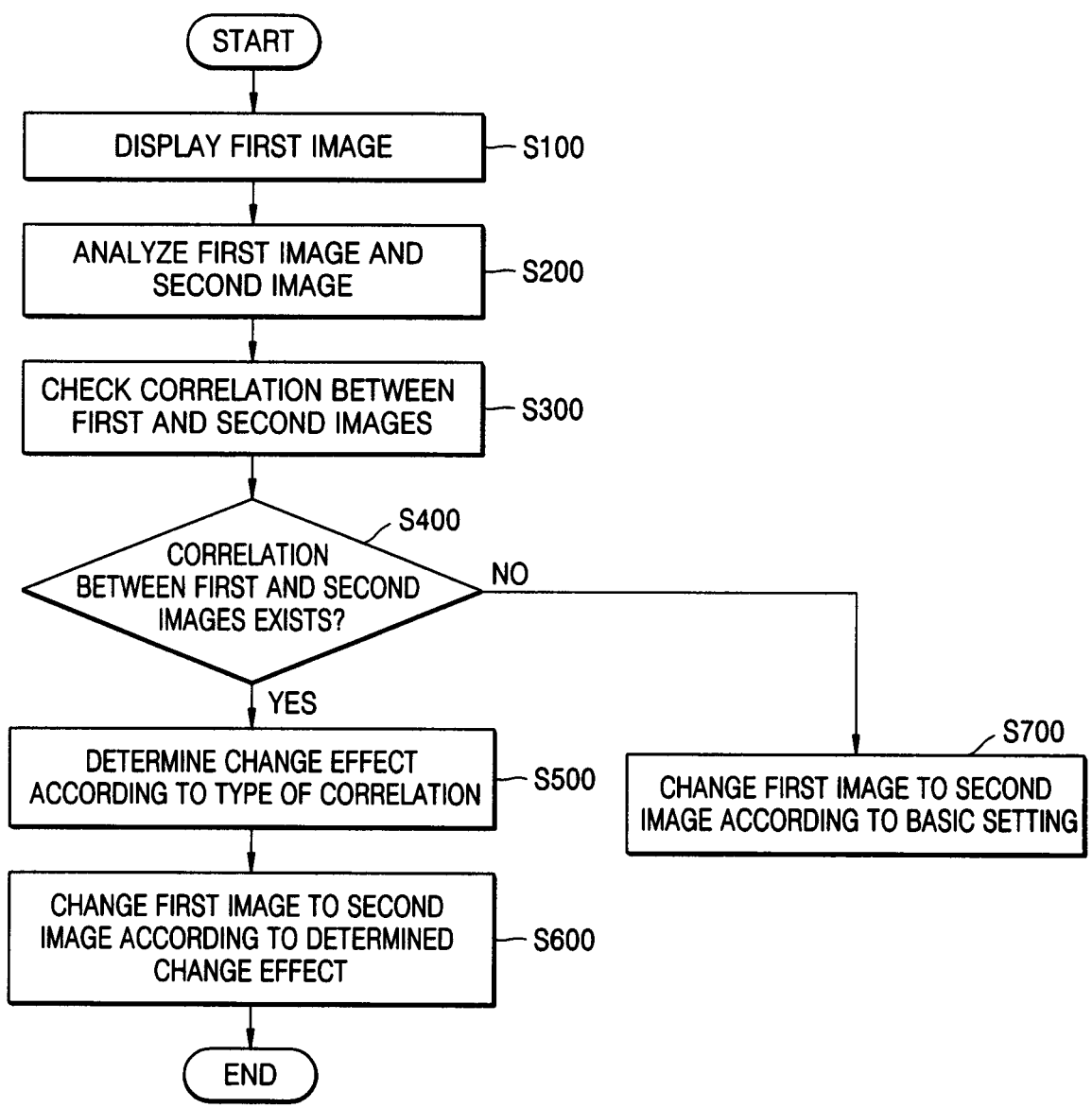
FIG. 3 is a flowchart of a method of changing a display of an image according to an image displaying method, according to an embodiment.

FIG. 3 is a flowchart of a method of changing a display of an image according to an image displaying method, according to an embodiment.

Hereinafter, details overlapping those described above with reference to FIGS. 1 and 2 are not provided again.

Referring to FIG. 3, the image displaying apparatus 100 according to an embodiment displays a first image in operation S100. The image displaying apparatus 100 may display the first image that is one of digital images stored in the image displaying apparatus or received from an external source.

Then, the image displaying apparatus 100 analyzes the first image and a second image, in operation S200. Here, the second image may be an image to be displayed after the first image, and may be pre-determined. Alternatively, the second image may be an image selected by the user of the image displaying apparatus 100 or according to an internal or external image selecting algorithm of the image displaying apparatus 100, while the first image is being displayed, and may be an image selected to be displayed through the image displaying apparatus 100 immediately after the first image is displayed. The image displaying apparatus 100 may analyze each of the first and second images by applying any one of various image processing techniques on each of the first and second images. Also, the image displaying apparatus 100 may analyze the first and second images together by applying any one of various image processing techniques simultaneously using the first and second images.

Then, the image displaying apparatus 100 checks a correlation between the first and second images, in operation S300. Here, the image displaying apparatus 100 may determine whether the first and second images are at least parts of the same image. In other words, the image displaying apparatus 100 may determine whether the first and second images are images indicating different parts of the same image.

Next, the image displaying apparatus 100 determines whether the correlation exists between the first and second images, based on the result of the checking in operation S300.

When it is determined that the correlation exists between the first and second images, the image displaying apparatus 100 determines a change effect according to the type of the correlation, in operation S500. In other words, the image displaying apparatus 100 determines a change effect to be applied when an image being displayed is changed from the first image to the second image, according to the checked correlation between the first and second images. Then, the image displaying apparatus 100 changes the first image to the second image by applying the determined change effect, in operation S600. The changing of the image being displayed may be performed by the image displaying apparatus 100 according to an image changing command received from the user or manager of the image displaying apparatus 100 or by the image displaying apparatus 100 when a pre-set condition, such as a lapse of a certain period of time, is satisfied.

When it is determined that the correlation between the first and second images does not exist, the image displaying apparatus 100 changes the image being displayed from the first image to the second image according to a basic setting, in operation S700. Here, the basic setting may be a setting to which a specific change effect is not applied. In this case, in operation S700, the image displaying apparatus 100 may be displaying the first image and immediately change the first image to the second image without an intermediate process. Alternatively, the basic setting may be any one of various change effects, such as a scrolling change in a certain direction, a fade-in effect, and a fade-out effect. In this case, in operation S700, the image displaying apparatus 100 may be displaying the first image and then change the first image to the second image while applying a certain change effect.

FIGS. 4 through 6C are diagrams for describing a method of changing a display of an image, according to an embodiment.

Figure 4:
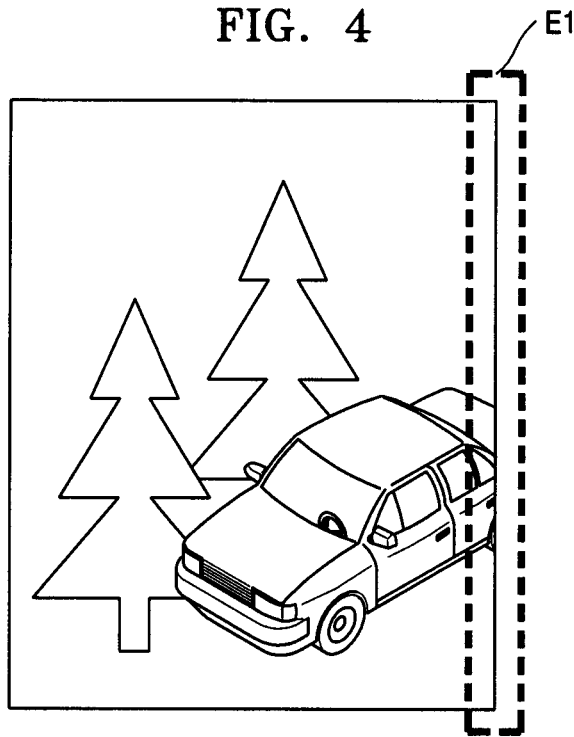
FIGS. 4, 5 and 6A-6C are diagrams for describing a method of changing a display of an image, according to an embodiment.
Figure 5:
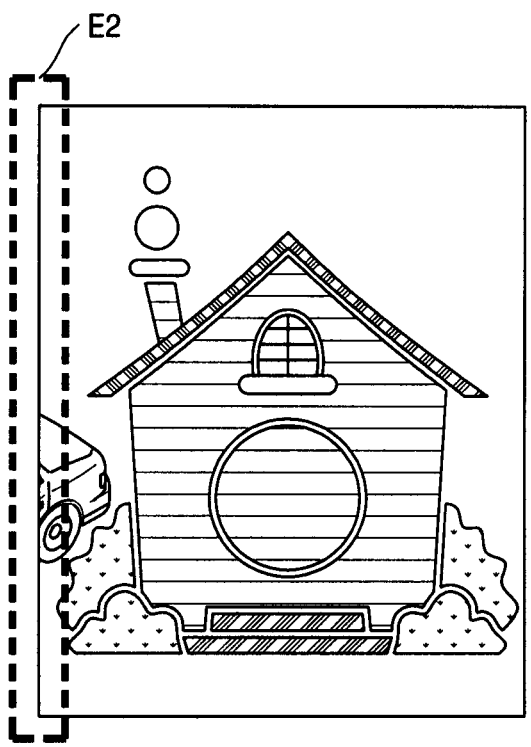

Referring to FIGS. 4 and 5, first and second images may be in a relationship in which a first edge E1 of the first image and a second edge E2 of the second image are connected to each other. For example, referring to FIG. 4, the first image may show a tree and a car. Also, referring to FIG. 5, the second image may show a part of a car and a house. Here, the first edge E1 of the first image and the second edge E2 of the second image may be connected to each other. In other words, the first and second images may form one image when the first and second edges E1 and E2 are listed to contact each other. In this case, the checker 120 of the image displaying apparatus 100 may determine that the first and second images have a first correlation therebetween. In other words, the first and second images may be analyzed, and when it is determined that the first edge E1 of the first image and the second edge E2 of the second image are connected to each other, the checker 120 of the image displaying apparatus 100 may determine that the first and second images have the first correlation therebetween.

In this case, the determiner 130 of the image displaying apparatus 100 may determine, as a change effect, an effect in which the first image is scrolled and disappears in a direction opposite the first edge E1 while the second edge E2 of the second image follows the first edge E1 onto the display. Here, the determiner 130 of the image displaying apparatus 100 may set the change effect such that the first and second edges E1 and E2 maintain contact with each other when the change effect is applied.

Figure 6A:
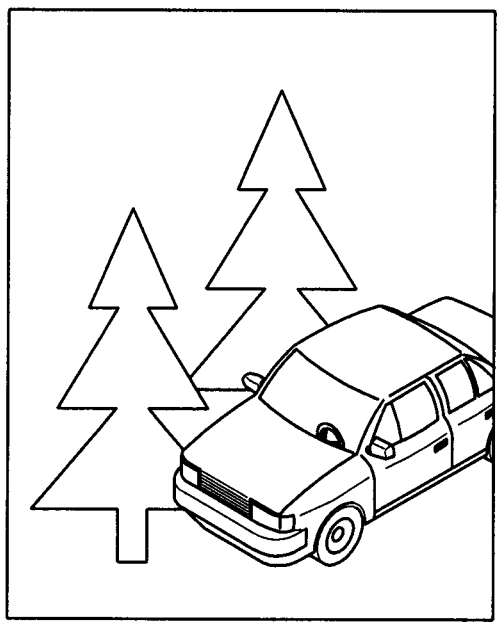
Figure 6B:
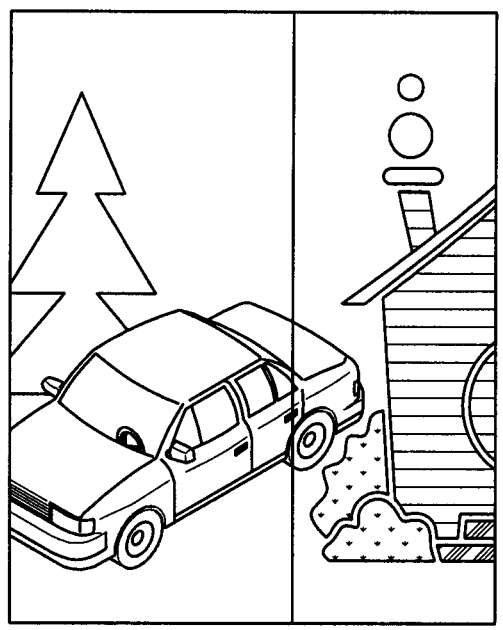
Figure 6C:
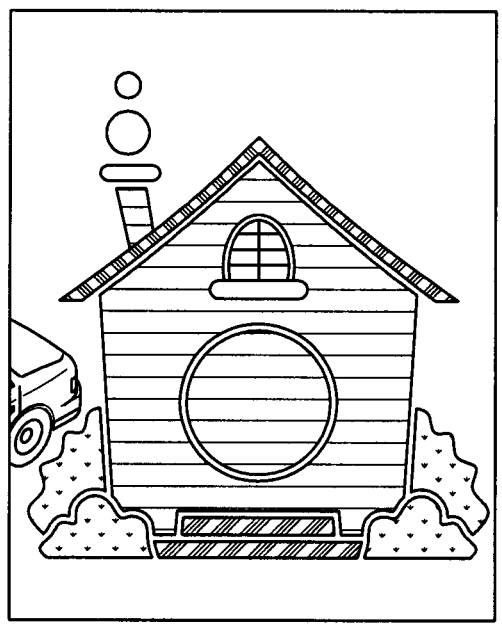

Then, the changer 140 of the image displaying apparatus 100 may apply the determined change effect while changing an image being displayed on the display 110 from the first image to the second image. In other words, while the first image is being displayed on the display 110 of the image displaying apparatus 100 as shown in FIG. 6A, the changer 140 may apply the effect in which the first image is scrolled and disappears in the direction opposite the first edge E1 while second edge E2 of the second image appears on the display, scrolling in the same direction as the first image, as shown in FIG. 6B. Then, as shown in FIG. 6C, the changer 140 may end an operation of changing the first image to the second image by displaying only the second image on the display 110. Accordingly, the image displaying apparatus 100 provides to the user viewing an image a natural change effect where there is a smooth transition or continuity, without an abrupt jump, from one image to another. Also, the image displaying apparatus 100 directly analyzes characteristics of images by applying an image processing technique even when the user viewing an image does not direct a specific change effect, such that a natural change effect may be provided to the user automatically.

The image displaying apparatus 100 may analyze the first and second images, and determine that the first and second images have the first correlation therebetween not only when the first and second edges E1 and E2 are connected to each other without any error, but also when results of analyzing the first and second edges E1 and E2 are similar to each other by at least a certain percentage. For example, the first image and/or the second image may have noise or may be distorted through an image processing operation, such as an image storing operation, an image changing operation, an image resizing operation, an image compressing operation, or an image exchanging operation. Alternatively, the first image and/or the second image may have noise or may be distorted while the first image and/or the second image are captured or drawn. Alternatively, the first and second images may be, from the beginning, connected to each other with a certain level of deviation, instead of being connected to each other without any error. In this case as well, when the image displaying apparatus 100 determines that the first and second images have the first correlation therebetween and changes the first image to the second image by using a change effect according to the first correlation, the image displaying apparatus 100 may provide a satisfactory viewing effect to the user. Accordingly, the image displaying apparatus 100 may also determine that the first and second images have the first correlation therebetween when the results of analyzing the first and second edges E1 and E2 are similar by at least a certain percentage (for example, when pixel values of pixels of the first edge E1 and pixel values of pixels of the second edge E2 match each other by at least 90% or when a location of an edge on the first edge E1 and a location of an edge on the second edge E2 match each other).

In FIGS. 4 through 6C, the first and second images are rectangles while the first and second edges E1 and E2 contacting each other are sides of the rectangles, but an embodiment is not limited thereto. In other words, the image displaying apparatus 100 may display an image having any one of various polygons, such as a triangle and a pentagon, a circle, an oval, and other various geometric shapes. Also, the image displaying apparatus 100 may provide a change effect as described above even when images are changed, wherein the images are displayed in any one of various geometric shapes and have at least partial edges connected to each other.

FIGS. 7 through 9C are diagrams for describing a method of changing a display of an image, according to another embodiment.

Figure 7:
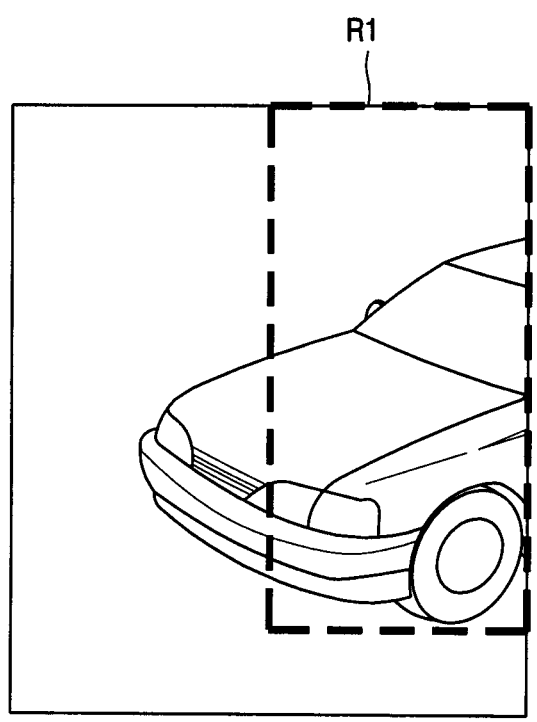
FIGS. 7, 8 and 9A-9C are diagrams for describing a method of changing a display of an image, according to another embodiment.
Figure 8:
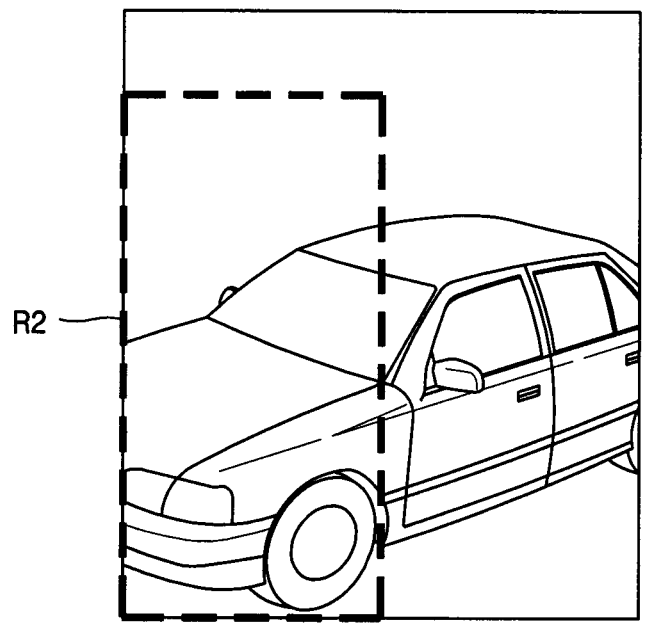

Referring to FIGS. 7 and 8, first and second images may be in a relationship in which a first region R1 occupying at least a part of the first image and a second region R2 occupying at least a part of the second image correspond to each other. For example, referring to FIG. 7, the first image may show a front portion of a car. Also, referring to FIG. 8, the second image may show a middle portion of a car. Here, an image in the first region R1 of the first image and an image in the second region R2 of the second image may be the same or similar. In other words, when the first and second images are arranged such that the first and second regions R1 and R2 overlap each other, the first and second images may form one image. In this case, the checker 120 of the image displaying apparatus 100 may determine that the first and second images have a second correlation therebetween. In other words, when it is determined that the first region R1 and the second region R2 are the same or similar by analyzing the first and second images, the checker 120 of the image displaying apparatus 100 may determine that the first and second images have the second correlation therebetween.

In this case, the determiner 130 of the image displaying apparatus 100 may determine, as a change effect, an effect in which the first image is changed to the second image as the first region R1 of the first image is scrolled to a location of the second region R2 of the second image.

Figure 9A:
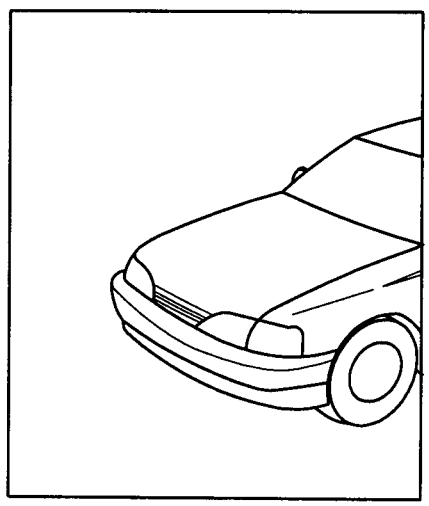
Figure 9B:
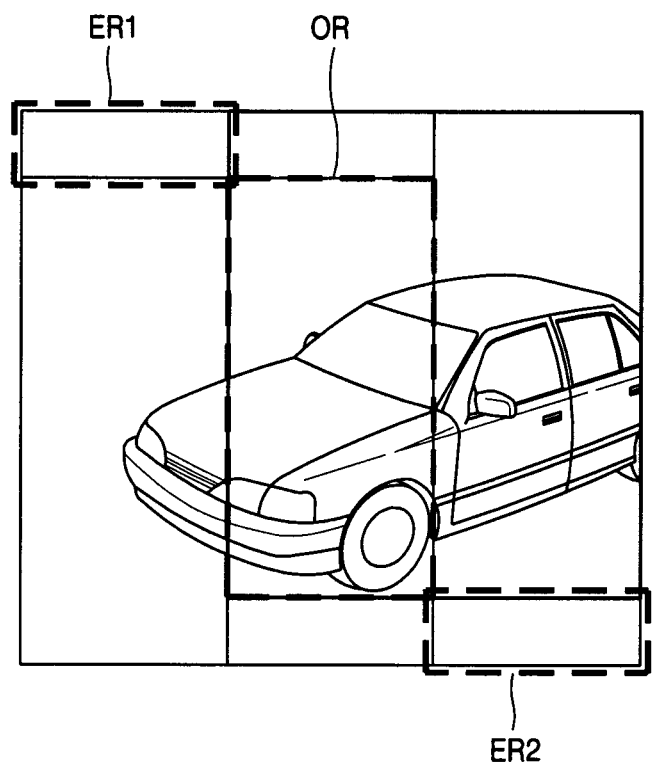
Figure 9C:
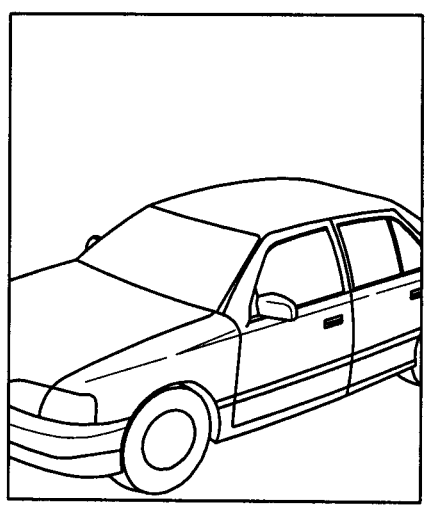

Then, the changer 140 of the image displaying apparatus 100 may apply the determined change effect while changing an image being displayed on the display 110 from the first image to the second image. In other words, while the first image is displayed on the display 110 of the image displaying apparatus 100 as shown in FIG. 9A, the changer 140 may display the first region R1 of the first image being scrolled and moved to the location of the second region R2 of the second image as shown in FIG. 0.9B. Here, an overlapping region OR may be the first region R1 of the first image while being overlapped with the second region R2 of the second image. In other words, the first image may be displayed on one side of the overlapping region OR generated as the first region R1 is scrolled and moved to the location of the second region R2, and the second image may be displayed on another side of the overlapping region OR. Here, a first external region ER1 and a second external region ER2 may be regions in which image information does not exist in the first and second images. In this case, the image displaying apparatus 100 may display, in the first and second external regions ER1 and ER2, a certain single color image or an image expressed in a certain pattern. Alternatively, the image displaying apparatus 100 may predict and display an image in the first and second external regions ER1 and ER2 by using at least one of various image processing techniques. Then, as shown in FIG. 9C, the changer 140 may end an operation of changing the first image to the second image by displaying only the second image on the display 110. Accordingly, the image displaying apparatus 100 may provide a natural change effect to the user viewing an image. Also, the image displaying apparatus 100 directly analyzes characteristics of images by applying an image processing technique even when the user viewing an image does not direct a specific change effect, such that a natural change effect may be provided to the user automatically.

The image displaying apparatus 100 may analyze the first and second images, and determine that the first and second images have the second correlation therebetween not only when the first and second regions R1 and R2 are completely the same without any error, but also when the first and second regions R1 and R2 are the same as each other by at least a certain percentage. For example, the first image and/or the second image may have noise or may be distorted through an image processing operation, such as an image storing operation, an image changing operation, an image resizing operation, an image compressing operation, or an image exchanging operation. Alternatively, the first image and/or the second image may have noise or may be distorted while the first image and/or the second image are captured or drawn. Alternatively, the first and second images may have, from the beginning, a certain level of deviation, without any regions that are completely the same. In this case as well, when the image displaying apparatus 100 determines that the first and second images have the second correlation therebetween and changes the first image to the second image by using a change effect according to the second correlation, the image displaying apparatus 100 may provide a satisfactory viewing effect to the user. Accordingly, the image displaying apparatus 100 may also determine that the first and second images have the second correlation therebetween when the results of analyzing the first and second regions R1 and R2 are similar to each other by at least a certain percentage (for example, when pixel values of pixels of the first region R1 and pixel values of pixels of the second region R2 match each other by at least 90% or when at least 90% of pixels are different within a certain range from among the pixel values of the pixels of the first and second regions R1 and R2).

In FIGS. 7 through 9C, the first and second images are rectangles while the first and second regions R1 and R2 are also rectangles, but an embodiment is not limited thereto. In other words, the image displaying apparatus 100 may display an image having any one of various polygons, such as a triangle and a pentagon, a circle, an oval, and other various geometric shapes. Also, the image displaying apparatus 100 may provide a change effect as described above even when images are changed, wherein the images are displayed in any one of various geometric shapes and have same or similar partial regions.

FIGS. 10 through 12C are diagrams for describing a method of changing a display of an image, according to another embodiment.

Figure 10:
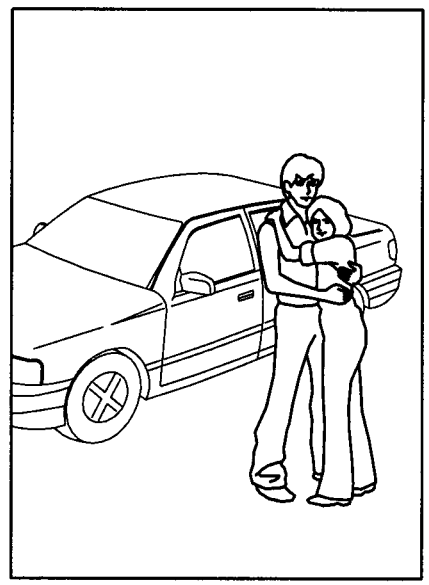
FIGS. 10, 11 and 12A-12C are diagrams for describing a method of changing a display of an image, according to another embodiment.
Figure 11:

Referring to FIGS. 10 and 11, a second image may correspond to an image obtained by enlarging a partial region of a first image by a certain ratio. For example, referring to FIG. 10, the first image may show two people and a car in a background. Also, referring to FIG. 11, the second image may show portions of upper bodies of two people and a part of a car corresponding to a background. Here, the second image may be an image obtained by enlarging a region in the first image, which corresponds to the portions of the upper bodies of the two people and the part of the car in the background. In other words, the image obtained by enlarging the partial region of the first image by the certain ratio may be the same or similar image as the second image. In this case, the checker 120 of the image displaying apparatus 100 may determine that the first and second images have a third correlation therebetween. In other words, when image displaying apparatus 100 analyzes the first and second images and determines that the image obtained by enlarging the partial region of the first image by the certain ratio is the same as or similar to the second image, the checker 120 of the image displaying apparatus 100 may determine that the first and second images have the third correlation therebetween.

In this case, the determiner 130 of the image displaying apparatus 100 may determine, as a change effect, an effect in which the second image appears as an enlarged partial region of the first image in a zoom-in method.

Figure 12A:
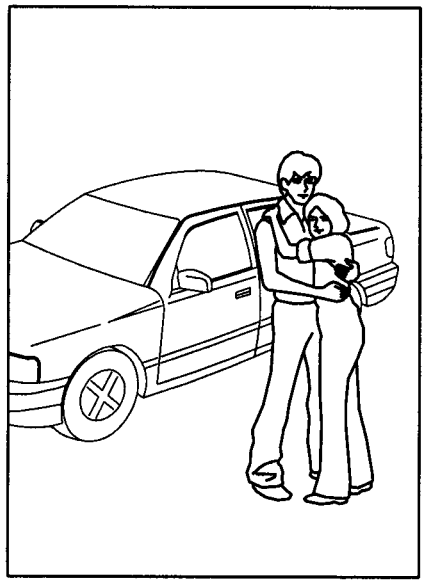
Figure 12B:
Figure 12C:
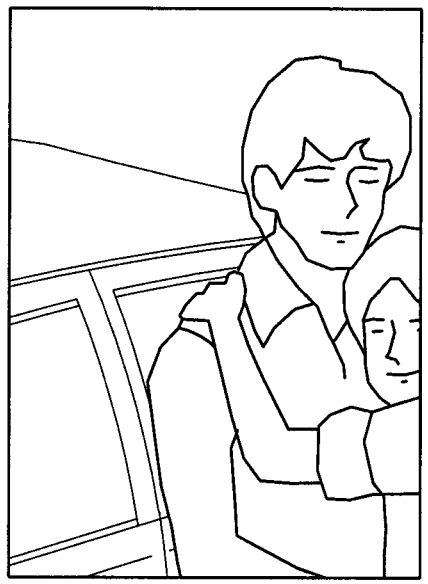

Then, the changer 140 of the image displaying apparatus 100 may apply the determined change effect while changing an image being displayed on the display 110 from the first image to the second image. In other words, while the first image is being displayed on the display 110 of the image displaying apparatus 100 as shown in FIG. 12A, the changer 140 may apply the effect of enlarging a partial region of the first image (in particular, the partial region that is the same as or similar to the second image) by zooming-in on the first image as shown in FIG. 12B. Then, the changer 140 may end an operation of changing the first image to the second image by only displaying the second image on the display 110 as shown in FIG. 12C. Accordingly, the image displaying apparatus 100 may provide a natural change effect to the user viewing an image. Also, the image displaying apparatus 100 directly analyzes characteristics of images by applying an image processing technique even when the user viewing an image does not direct a specific change effect, such that a natural change effect may be provided to the user automatically.

The image displaying apparatus 100 may analyze the first and second images, and determine that the partial region of the first image is completely the same as the second image without any error, but also when it is determined that the partial region of the first image is similar to the second image by at least a certain percentage based on results of analyzing the partial region of the first image and the second image. For example, the first image and/or the second image may have noise or may be distorted through an image processing operation, such as an image storing operation, an image changing operation, an image resizing operation, an image compressing operation, or an image exchanging operation. Alternatively, the first image and/or the second image may have noise or may be distorted while the first image and/or the second image are captured or drawn. Alternatively, the partial region and second image may be, from the beginning, the same as each other with a certain level of deviation, instead of being the same without any error. In this case as well, when the image displaying apparatus 100 determines that the first and second images have the third correlation therebetween and changes the first image to the second image by using a change effect according to the third correlation, the image displaying apparatus 100 may provide a satisfactory viewing effect to the user. Accordingly, the image displaying apparatus 100 may also determine that the first image and second image have the third correlation therebetween when the partial region of the first image and the second image are similar to each other by at least a certain percentage (for example, when pixel values of pixels of the partial region of the first image and pixel values of pixels of the second image match each other by at least 90% or when at least 90% of pixels are different within a certain range from among the pixel values of the pixels of the partial region of first image and the second image).

In FIGS. 10 through 12C, the second image corresponds to the image obtained by enlarging the partial region of the first image by a certain ratio, but the image displaying apparatus 100 may change the first image to the second image while applying a similar change effect even when the first image corresponds to an image obtained by enlarging a partial region of the second image by a certain ratio. For example, when FIG. 11 is the first image and FIG. 10 is the second image, the checker 120 of the image displaying apparatus 100 may determine that the first and second images have a fourth correlation therebetween. In this case, the determiner 130 of the image displaying apparatus 100 may determine, as a change effect, an effect in which the second image appears as the first image is reduced by zooming-out on the first image using a zoom-out method. Then, the changer 140 of the image displaying apparatus 100 may apply the determined change effect while changing an image being displayed on the display 110 from the first image to the second image.

In FIGS. 10 through 12C, the first and second images are rectangles, but an embodiment is not limited thereto. In other words, the image displaying apparatus 100 may display an image having any one of various polygons, such as a triangle and a pentagon, a circle, an oval, and other various geometric shapes. Also, the image displaying apparatus 100 may provide a change effect as described above while changing images even when a partial region of an image is the same as or similar to another image from among images displayed in any one of various geometric shapes.

FIGS. 13 through 15D are diagrams for describing a method of changing a display of an image, according to another embodiment.

Figure 13:
FIGS. 13, 14 and 15A-15D are diagrams for describing a method of changing a display of an image, according to another embodiment.
Figure 14:
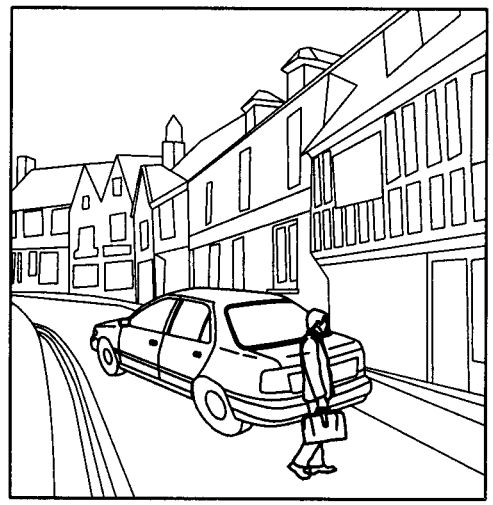

Referring to FIGS. 13 and 14, first and second images may be the same as or similar to each other by at least a certain percentage, 90% or above, for example, and may be different only in some regions. For example, referring to FIG. 13, the first image may show buildings and a road besides the buildings. Also, referring to FIG. 14, the second image may show a car and a person on the road in addition to the first image. Here, the first and second images may be the same or similar in the buildings and the road, while different in the car and the person. In this case, the checker 120 of the image displaying apparatus 100 may determine that the first and second images have a fifth correlation therebetween. In other words, the image displaying apparatus 100 may analyze the first and second images, and when the first and second images are the same as or similar to each other by at least a certain percentage and are different in some regions, the checker 120 of the image displaying apparatus 100 may determine that the first and second images have the fifth correlation therebetween.

In this case, the determiner 130 of the image displaying apparatus 100 may determine, as a change effect, an effect in which the first image changes to the second image while the difference between the first and second images is gradually changed in a fade-in or fade-out method, i.e., the portion or region of the first image that is different from the second image is gradually faded-in or faded-out of the second image.

Figure 15A:
Figure 15B:
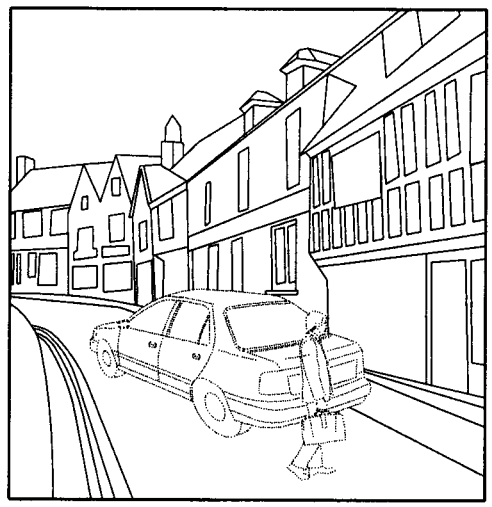
Figure 15C:
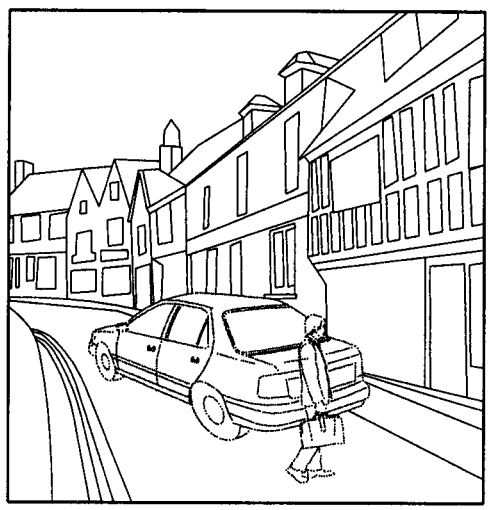
Figure 15D:
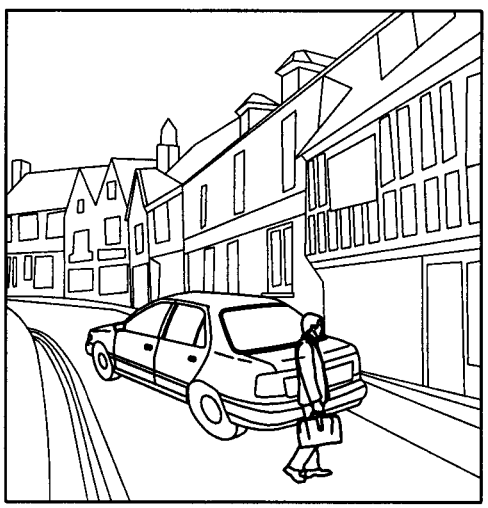

Then, the changer 140 of the image displaying apparatus 100 may apply the determined change effect while changing an image being displayed on the display 110 from the first image to the second image. In other words, while the first image is displayed on the display 110 of the image displaying apparatus 100 as shown in FIG. 15A, the changer 140 may change the first image such that the car and the person gradually appear on the road of the first image in a fade-in method as shown in FIG. 15B. Then, the changer 140 of the image displaying apparatus 100 may further clearly display the car and the person appearing in the fade-in method as shown in FIG. 15C, and then end an operation of changing the first image to the second image as shown in FIG. 15D. Accordingly, the image displaying apparatus 100 may provide a natural change effect to the user viewing an image. Also, the image displaying apparatus 100 directly analyzes characteristics of images by applying an image processing technique even when the user viewing an image does not direct a specific change effect, such that a natural change effect may be provided to the user automatically.

The image displaying apparatus 100 may analyze the first and second images, and determine that the first and second images have the fifth correlation therebetween not only when partial regions of the first and second images are completely the same without any error, but also when partial regions of the first and second images are similar to each other by at least a certain percentage. For example, the first image and/or the second image may have noise or may be distorted through an image processing operation, such as an image storing operation, an image changing operation, an image resizing operation, an image compressing operation, or an image exchanging operation. Alternatively, the first image and/or the second image may have noise or may be distorted while the first image and/or the second image are captured or drawn. Alternatively, the first and second images may have, from the beginning, a certain level of deviation, without any regions that are completely the same. In this case as well, when the image displaying apparatus 100 determines that the first and second images have the fifth correlation therebetween and changes the first image to the second image by using a change effect according to the fifth correlation, the image displaying apparatus 100 may provide a satisfactory viewing effect to the user. Accordingly, the image displaying apparatus 100 may also determine that the first and second images have the fifth correlation therebetween when at least a certain percentage of areas of the first and second images are similar to each other by at least a certain level (for example, when pixel values of pixels of the first and second images in at least a certain percentage of areas match each other by at least 90%, when at least 90% of pixels are different within a certain range from among the pixel values of the pixels of the first and second images), or when edge locations or object arrangement relationships in at least a certain percentage of areas of the first and second images are the same as each other by at least a certain level).

In FIGS. 13 through 15D, the first and second images are rectangles, but an embodiment is not limited thereto. In other words, the image displaying apparatus 100 may display an image having any one of various polygons, such as a triangle and a pentagon, a circle, an oval, and other various geometric shapes. Also, the image displaying apparatus 100 may provide a change effect as described above even when images are changed, wherein the images are only partially different.

According to one or more embodiments, a website known to be a spam website may be analyzed to determine characteristics thereof, and it may be determined whether another website is a spam website by using the determined characteristics. Also, according to one or more embodiments, features in a region that is not changed in a webpage are determined, and it is determined whether such features are the same or similar in different websites, thereby determining whether the different websites are generated by using the same platform.

According to an image displaying apparatus, method, and computer program of the present invention, the current image being displayed and a subsequent image to be displayed may be analyzed to determine a change effect applied when the current image is changed to the subsequent image.

Also, according to the image displaying apparatus, method, and computer program of the present invention, a correlation between the current image and the subsequent image may be analyzed and a change effect suitable to a result of the analyzing may be applied to change the current image to the subsequent image.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image displaying apparatus for displaying an image by changing a first image to a second image, the apparatus comprising:
    a display displaying an image switching from the first image to the second image; and
    a processor having a plurality of functional units configured to execute a plurality of functions, the plurality of functional units including;
        a checker configured to check whether a correlation exists between the first image and the second image by determining whether each of the first image and the second image is a least a part of a same image;
        a determiner configured to determine a change effect to be applied when the display is changed from a state of displaying the first image to a state of displaying the second image, based on determining that the correlation exists; and
        a changer configured to change an image displayed on the display from the first image to the second image by applying the change effect,
    wherein the determiner is further configured to determine that no change effect is to be applied based on determining that no correlation exists.

2. The image displaying apparatus of claim 1, wherein the checker is further configured to determine that the first and second images have a first correlation therebetween when a first edge of the first image and a second edge of the second image are connected to each other, and
    the determiner is further configured to determine, as the change effect, an effect in which the first image is scrolled and disappears in a direction opposite the first edge while the second edge of the second image follows the first edge onto the display, when the first and second images have the first correlation therebetween.

3. The image displaying apparatus of claim 2, wherein the checker is further configured to determine that the first and second images have the first correlation therebetween when pixel information of the first edge and pixel information of the second edge are similar by at least a certain percentage.

4. The image displaying apparatus of claim 1, wherein the checker is further configured to determine that the first and second images have a second correlation therebetween when a first region occupying at least a part of the first image and a second region occupying at least a part of the second image correspond to each other, and
    the determiner is further configured to determine, as the change effect, an effect in which the first image is changed to the second image as the first region of the first image is scrolled to a location where the second region of the second image exists, when the first and second images have the second correlation therebetween.

5. The image displaying apparatus of claim 4, wherein the checker is further configured to determine that the first and second images have the second correlation therebetween when pixel information of the first region and pixel information of the second region are similar to each other by at least a certain percentage.

6. The image displaying apparatus of claim 1, wherein the checker is further configured to determine that the first and second images have a third correlation therebetween when a partial region of the first image corresponds to an image obtained by reducing the second image by a certain ratio, and the determiner is further configured to determine, as the change effect, an effect in which the partial region of the first image is enlarged by zooming-in on the first image to be changed to the second image, when the first and second images have the third correlation therebetween.

7. The image displaying apparatus of claim 1, wherein the checker is further configured to determine that the first and second images have a fourth correlation therebetween when the first image corresponds to an image obtained by enlarging a partial region of the second image by a certain ratio, and the determiner is further configured to determine, as the change effect, an effect in which the first image is reduced by zooming-out on the first image to be changed to the second image, when the first and second images have the fourth correlation therebetween.

8. The image displaying apparatus of claim 1, wherein the checker is further configured to determine that the first and second images have a fifth correlation therebetween when the first and second images are identical to each other by at least a certain percentage, and the determiner is further configured to determine, as the change effect, an effect in which the first image is changed to the second image when content which is different between the first and second images is faded-in or faded-out of the second image, when the first and second images have the fifth correlation therebetween.

9. The image displaying apparatus of claim 1, wherein the changer is further configured to change the image displayed on the display from the first image to the second image when an image change request is received through an input unit or when a time of displaying the first image, which is calculated through an elapsed time calculator, has passed a certain period of time.

10. An image displaying method performed by an image displaying apparatus for displaying an image by changing a first image to a second image, the image displaying method comprising:

displaying an image switching from the first image to the second image, on a display;

checking whether a correlation exists between the first image and the second image by determining whether each of the first image and the second image is at least a part of a same image;

determining a change effect to be applied when the display is changed from a state of displaying the first image to a state of displaying the second image based on determining that the correlation exists; and changing an image being displayed from the first image to the second image by applying the change effect, wherein no change effect is determined to be applied based on determining that no correlation exists.

11. The image displaying method of claim 10, wherein the checking comprises determining that the first and second images have a first correlation therebetween when a first edge of the first image and a second edge of the second image are connected to each other, and the determining comprises determining, as the change effect, an effect in which the first image is scrolled and disappears in a direction opposite the first edge while the second edge of the second image follows the first edge onto the display, when the first and second images have the first correlation therebetween.

12. The image displaying method of claim 10, wherein the checking comprises determining that the first and second images have a second correlation therebetween when a first region occupying at least a part of the first image and a second region occupying at least a part of the second image correspond to each other, and the determining comprises determining, as the change effect, an effect in which the first image is changed to the second image as the first region of the first image is scrolled to a location where the second region of the second image exists, when the first and second images have the second correlation therebetween.

13. The image displaying method of claim 10, wherein the checking comprises determining that the first and second images have a third correlation therebetween when a partial region of the first image corresponds to an image obtained by reducing the second image by a certain ratio, and the determining comprises determining, as the change effect, an effect in which the partial region of the first image is enlarged in by zooming-in on the first image to be changed to the second image, when the first and second images have the third correlation therebetween.

14. The image displaying method of claim 10, wherein the checking comprises determining that the first and second images have a fourth correlation therebetween when the first image corresponds to an image obtained by enlarging a partial region of the second image by a certain ratio, and the determining comprises determining, as the change effect, an effect in which the first image is reduced by zooming-out on the first image to be changed to the second image, when the first and second images have the fourth correlation therebetween.

15. The image displaying method of claim 10, wherein the checking comprises determining that the first and second images have a fifth correlation therebetween when the first and second images are identical to each other by at least a certain percentage, and the determining comprises determining, as the change effect, an effect in which the first image is changed to the second image when content which is different between the first and second images is faded-in or faded-out of the second image, when the first and second images have the fifth correlation therebetween.

16. A computer program stored on a non-transitory computer readable storage medium, for executing an image displaying method executed by a computer for displaying an image by changing a first image to a second image, the method comprising:

displaying an image switching from the first image to the second image, on a display;

checking whether a correlation exists between the first image and the second image by determining whether each of the first image and second image is at least a part of a same image;

determining a change effect to be applied when the display is changed from a state of displaying the first image to a state of displaying the second image based on determining that the correlation exists; and changing an image being displayed from the first image to the second image by applying the change effect, wherein no change effect is determined to be applied based on determining that no correlation exists.

* * * * *